(12) United States Patent
Griffin

(10) Patent No.: US 7,761,856 B2
(45) Date of Patent: Jul. 20, 2010

(54) DEFINING EXPRESSIONS IN A META-OBJECT MODEL OF AN APPLICATION

(75) Inventor: Catherine Susan Griffin, Romsey (GB)

(73) Assignee: International Business Machines Corporation, Armonk, NY (US)

(*) Notice: Subject to any disclaimer, the term of this patent is extended or adjusted under 35 U.S.C. 154(b) by 1140 days.

(21) Appl. No.: 11/274,535

(22) Filed: Nov. 15, 2005

(65) Prior Publication Data

US 2006/0130015 A1    Jun. 15, 2006

(30) Foreign Application Priority Data

Nov. 30, 2004    (GB)    ................. 0426240.8

(51) Int. Cl.
*G06F 9/44*    (2006.01)
*G06F 9/45*    (2006.01)
(52) U.S. Cl. .................... 717/137; 717/114
(58) Field of Classification Search ............ None
See application file for complete search history.

(56) References Cited

U.S. PATENT DOCUMENTS 7,093,231 B2 *    8/2006    Nuss ..................... 717/114

OTHER PUBLICATIONS

Meta Object Facility (MOF), Object Management Group (OMG), www.omg.org/docs/formal/02-04-03pdf (Meta Object Facility Specification, Version 1.4 Apr. 2002).

* cited by examiner

*Primary Examiner*—Chuck O Kendall
(74) *Attorney, Agent, or Firm*—Jordan Law LLC

(57) ABSTRACT

A method for defining expressions in a meta-object model of an application by locating a string representation of an expression including an identification of a language of the expression; accessing a data type definition corresponding to the language of the expression, the data type definition including a converter for converting the string representation of the expression into an executable runtime representation of the expression; and converting the string representation of the expression into an executable runtime representation of the expression.

19 Claims, 3 Drawing Sheets

DEFINING EXPRESSIONS IN A META-OBJECT MODEL OF AN APPLICATION

FIELD OF THE INVENTION

The present invention relates to defining expressions in a meta-object model of an application. In particular, it relates to defining programming language expressions for automatic inclusion in a Meta-Object Facility (MOF) model of an application.

BACKGROUND

A domain-specific language (DSL) is a software programming language dedicated to a particular domain or problem. Such languages provide abstractions and notations appropriate to a particular domain and are usually small, more declarative than imperative, and less expressive than a general-purpose language (GPL). For example, a language for specifying business rules might include abstractions like Rule and Condition. An appropriate DSL makes it easier for a user to define or solve a problem in that domain.

However, due to the specialized nature of DSLs, it is often necessary to combine a DSL with another programming language in order to fully specify a solution to a problem. For example, the Business Process Execution Language (BPEL) is a DSL for web-service scripting. Within a BPEL specification an additional language is used for specific data modification and logical expressions. Such an additional language is the Java programming language (Java is a registered trademark of Sun Microsystems Inc.).

Domain specific languages are commonly defined using a language definition standard known as the Meta-Object Facility (MOF) from the Object Management Group (OMG) (OMG and MOF are trademarks of the Object Management Group). A full and formal specification of MOF is available from the OMG at www.omg.org/docs/formal/02-04-03.pdf (Meta Object Facility Specification, Version 1.4, April 2002). The MOF standard provides a technique for specifying an abstract syntax (set of concepts) and a textual concrete syntax for a language. In the abstract syntax, an expression consisting of an expression body in string form and a language identifier can be used to allow arbitrary extensions in other programming languages to be used. Such an arrangement is illustrated in FIG. 1, and is described below.

FIG. 1 is a block diagram of an application MOF model 100 in the prior art, such as a MOF model of a domain specific language. The MOF model 100 includes one or more packages 102. In a MOF model, a package 102 is a container for classifiers including, for example, a class 106 and/or a data types 104. The class 106 is a defined structure which can be instantiated into corresponding objects. The data type 104 has no predefined structure, and can be instantiated to have a particular data value. MOF model 100 can also include expression 108. Expression 108 is an abstract expression consisting of a language identifier 110 for the expression (such as an identification of the Java language), and an expression body 112. Expression body 112 is a string representation of the expression. For example, the expression body can be an assignment expression such as "a=x", a mathematical expression such as "a=2y+4", or any other conceivable expression in the language identified by the language identifier 110. Expression body 112 could further be an entire subroutine, method, function, or procedure, although the expression body 112 is always represented in string form.

In use, the MOF model 100 is parsed by parser 120. The parser 120 can be an interpreter capable of interpreting the specification of the MOF model 100 and generating an application runtime 122 which is capable of actual execution on a computer system. Alternatively, the parser 120 can be a compiler. Parser 120 draws upon a MOF implementation 114 which includes base classes 116 which may be required to fully implement the application runtime 122. For example, base classes 116 might include fundamental functionality, data conversion, arithmetic operations, and the like. Further, it is necessary for the parser 120 to employ an expression language application programming interface (API) 118. The expression language API 118 provides facilities for the conversion of expression 108 into a runnable expression. For example, the expression language API 118 can provide an expression statement interpreter which parses the expression body 112 using a programming language identified by the language identifier 110 in order to generate an executable form of the expression 112. If the language identifier 110 indicates that the expression 108 is a Java expression, the expression language API 118 can employ a Java interpreter to generate an executable form of the expression 112 accordingly. In an alternative implementation, an expression language importer is used in place of the expression language API 118 to undertake the same function.

Thus MOF provides an extension mechanism through the definition of expressions having an expression language identifier and an expression body. However, for such extensions to be usable in the generation of an implementation of a MOF model, it is necessary for an implementer of the MOF model to provide the expression language API or an expression language importer in order that the meaning of an expression can be appropriately interpreted. There is currently no standard way to achieve this without the addition of nonstandard additional programming interfaces or importers.

Thus it would be advantageous to provide a mechanism for allowing new expression languages to be plugged in to a DSL which is defined using the MOF standard without the need for an API or expression language importer to support such new expression languages.

SUMMARY

The present invention accordingly provides, in a first aspect, a method for defining expressions in a meta-object model of an application comprising the steps of: locating a string representation of an expression including an identification of a language of the expression; accessing a data type definition corresponding to the language of the expression, the data type definition including a converter for converting the string representation of the expression into an executable runtime representation of the expression; and converting the string representation of the expression into an executable runtime representation of the expression. In this way, it is possible to extend a Meta-Object Facility (MOF) model to incorporate expression languages without the need to develop a bespoke API or importer for a language interpreter. Rather, the existing MOF framework for defining and using data types is employed to define and use expression languages. The MOF framework includes the definition of a converter for converting a string representation of a data value into a data value instance. It is therefore possible to employ the converter to generate an executable instance of an expression corresponding to a string representation of the expression. If required, an expression statement interpreter can be used by the converter to achieve this.

The present invention accordingly provides, in a second aspect, an apparatus for defining expressions in a meta-object model of an application comprising: means for locating a string representation of an expression, the string representation including an identification of a language of the expression; means for accessing a data type definition corresponding to the language of the expression, the data type definition including a converter for converting the string representation of the expression into an executable runtime representation of the expression; and means for converting the string representation of the expression into an executable runtime representation of the expression.

The present invention accordingly provides, in a third aspect, a computer program product comprising computer program code stored on a computer readable storage medium which, when executed on a data processing system, instructs the data processing system to carry out the method described above.

The present invention accordingly provides, in a fourth aspect, a computer system comprising: a central processing unit; a storage; an input/output interface; and the apparatus for defining expressions in a meta-object model of an application described above.

BRIEF DESCRIPTION OF THE DRAWINGS

A preferred embodiment of the present invention will now be described, by way of example only, with reference to the accompanying drawings, in which.

DETAILED DESCRIPTION

Figure 2:
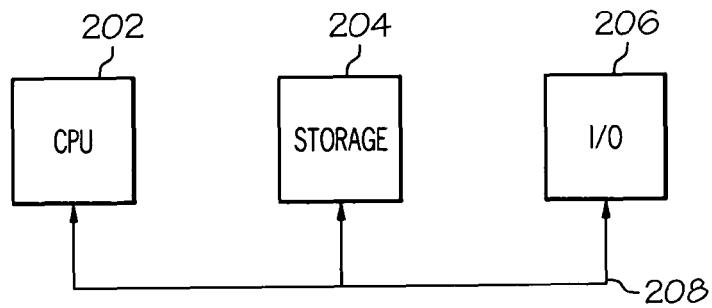
FIG. 2 is a block diagram of a computer system suitable for the operation of embodiments of the present invention.

FIG. 2 is a block diagram of a computer system suitable for the operation of embodiments of the present invention. A central processor unit (CPU) 202 is communicatively connected to a storage 204 and an input/output (I/O) interface 206 via a data bus 208. The storage 204 can be any read/write storage device such as a random access memory (RAM) or a nonvolatile storage device. An example of a nonvolatile storage device includes a disk or tape storage device. The I/O interface 206 is an interface to devices for the input or output of data, or for both input and output of data. Examples of I/O devices connectable to I/O interface 206 include a keyboard, a mouse, a display (such as a monitor) and a network connection.

Preferred embodiments of the present invention employ the MOF approach to defining and using data types to integrate expression languages into a MOF model without the need for an API or expression language importer. This MOF approach to defining and using data types is described below with respect to FIG. 3. The particular use of MOF data types to integrate an expression language into a MOF model is considered below with respect to FIG. 4.

Figure 3:
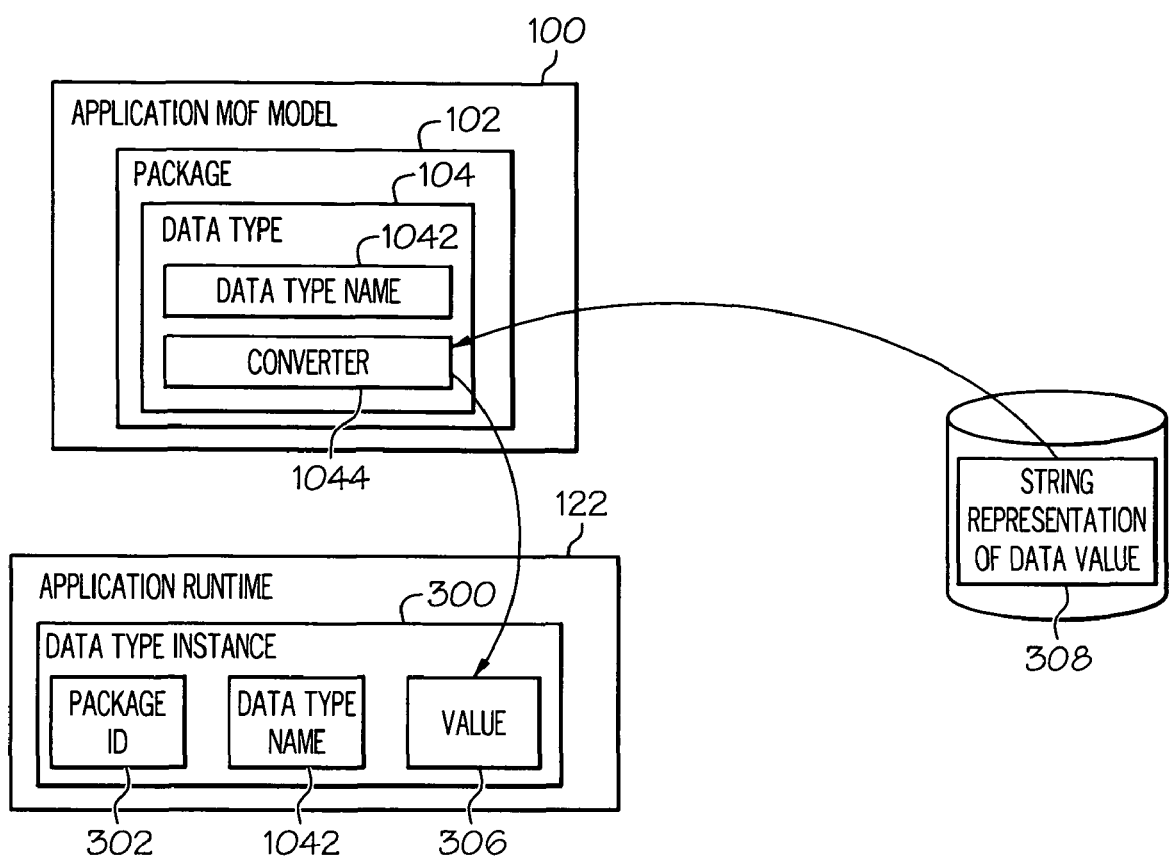
FIG. 3 is a block diagram of an application Meta-Object Facility (MOF) model including a data type.

FIG. 3 is a block diagram of an application Meta-Object Facility (MOF) model 100, such as a MOF model of a domain specific language, including a data type 104. The data type 104 is contained within a container 102 and includes a data type name 1042 and a converter 1044. The data type name 1042 is a unique name for data type 104 within the package 102 for reference of the data type 104. The converter 1044 is a definition of how a value of an instance of the data type 104 can be converted from a string representation. For example, if the data type 104 is a numeric floating point data type, the converter 1044 defines how numeric values in string representation (such as "2.175") are converted into corresponding numerical values in a computer system. The converter 1044 is necessary, since values for instances of MOF data types are stored in a generic string representation and need to be converted before use.

Figure 1:
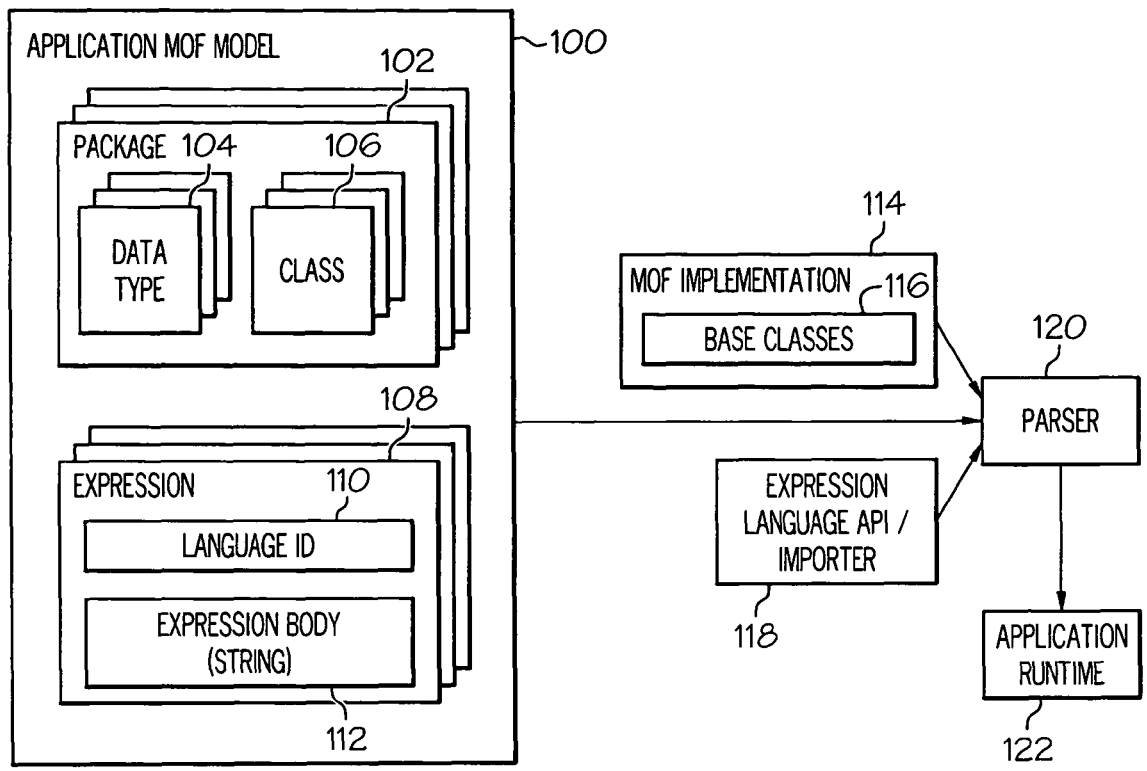
FIG. 1 is a block diagram of an application Meta-Object Facility (MOF) model in the prior art.

FIG. 3 further illustrates an application runtime 122 such as can be generated by the parser 120 of FIG. 1. The application runtime 122 includes a data type instance 300 having a package identifier 302 and data type name 1042. Together, the package identifier 302 and data type name 1042 uniquely identify a single data type in the MOF model 100. In the exemplary arrangement of FIG. 3, the data type instance 300 corresponds to an instance of the data type 104. Data type instance 300 further includes a value 306. The value 306 is derived from a string representation of the data value 308 stored on a storage device of a computer system, such as a fixed disk or memory. In generating the application runtime 122, a parser 120 locates and retrieves the string representation of the data value 308 and generates the data type instance 300 using the converter 1044. The converter 1044 is used to convert the string representation of the data value 308 into a data value instance 306 as described above.

Figure 4:
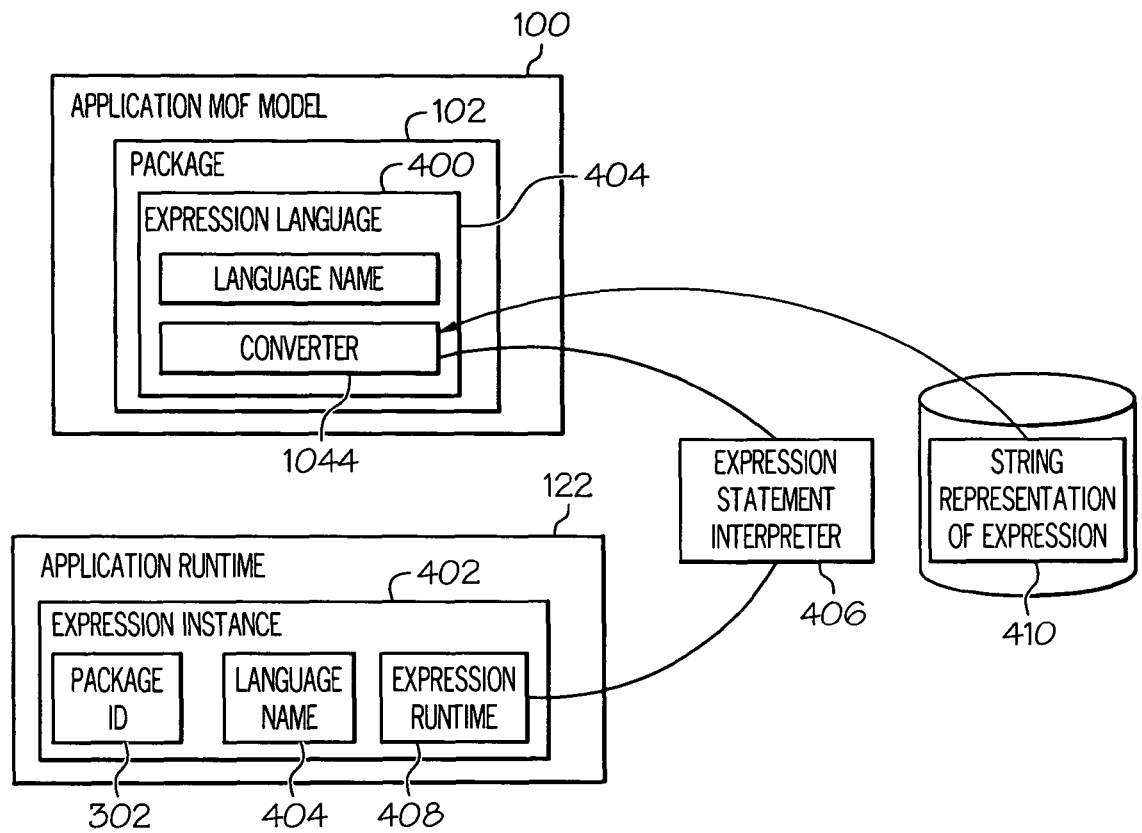
FIG. 4 is a block diagram of an application Meta-Object Facility (MOF) model including an expression language defined as a data type in accordance with a preferred embodiment of the present invention.

This approach to defining and using data types in MOF models is used to extend a MOF model to include expression languages and expressions. FIG. 4 is a block diagram of an application Meta-Object Facility (MOF) model 100, such as a MOF model of a domain specific language, including an expression language 102 defined as a data type in accordance with a preferred embodiment of the present invention. In FIG. 4, the expression language 400 is contained in the package 102 as a MOF data type and includes a language name 404 (corresponding to the data type name 1042) and a converter 1044. In FIG. 4, the converter 1044 is adapted to convert a string representation of an expression in an expression language identified by the language name 404 into expression instances suitable for execution at runtime. To achieve this, the converter 1044 can use an expression statement interpreter 406 which parses the string representation of an expression using a programming language identified by the language name 404 in order to generate an executable form of the expression 408. Alternatively, the expression statement interpreter 406 can be replaced with an expression statement compiler.

FIG. 4 further illustrates an application runtime 122 such as can be generated by the parser 120 of FIG. 1. The application runtime 122 includes an expression instance 402 (corresponding to the data type instance 300). The expression instance 402 has a package identifier 302 and a language name 404. Together, the package identifier 302 and language name 1042 uniquely identify a single expression language defined as a data type in the MOF model 100. In the exemplary arrangement of FIG. 4, the expression instance 402 corresponds to an instance of the expression language 400. Expression instance 402 further includes an expression runtime 408. The expression runtime 408 is a runtime executable expression derived from a string representation of the expression 410 stored on a storage device of a computer system. In generating the application runtime 122, a parser 120 locates and retrieves the string representation of the expression 410 and generates the expression instance 402 using the converter 1044.

Figure 5:
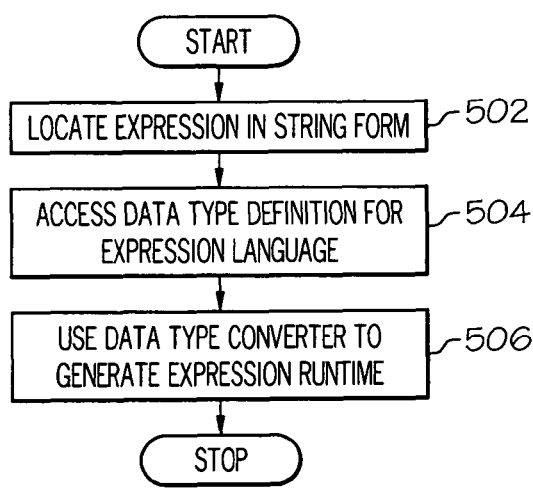
FIG. 5 is a flowchart illustrating a method for generating an expression instance in accordance with a preferred embodiment of the present invention.

FIG. 5 is a flowchart illustrating a method for generating an expression instance in accordance with a preferred embodiment of the present invention. At step 502, a string representation of an expression 410 is located. Preferably, the string representation of the expression 410 includes an identification of a language of the expression (such as Java). At step 504, a data type definition corresponding to the language of the expression (expression language 400) is accessed. The data type definition includes a converter 1044 for converting the string representation of the expression 308 into an executable runtime representation of the expression 408. Finally, at step 506, the string representation of the expression 308 is converted into an executable runtime representation of the expression 408 using the converter 1044.

For example, the string representation of the expression 410 can be a string representation of a Java expression and the expression language 400 can be Java. In this example, the converter 1044 is therefore a routine for converting a string form of a Java expression into a runtime Java object. A parser 120 generates application runtime 122 by converting the string representation of the Java expression 410 using the converter 1044 and the expression statement interpreter 406. Thus, at runtime the expression instance 402 includes a runtime executable Java object as the expression runtime 408. In this way it is possible to extend a MOF model to incorporate expression languages without the need to develop a bespoke API or importer for a language interpreter. Rather, the existing MOF framework for defining and using data types is employed to define and use expression languages. Since the MOF framework includes the definition of a converter 1044 to convert a string representation of a data value into a data value instance, it is possible to refer to an expression statement interpreter 406 within an expression language data type definition.

In an alternative embodiment, it may be necessary for expression runtime 408 to access a value of one or more arguments, or to provide a return code. These arguments and return codes can be readily provided through an expression context as is well known in the art.

What is claimed is:

1. A computer-implemented method comprising:
locating a string representation of an expression, the string representation of the expression including an identification of a programming language associated with the expression, the string representation of the expression to be converted into the expression based on the programming language, wherein the string representation of the expression is defined in a meta-object model of an application;
accessing a data type definition corresponding to the programming language, the data type definition including a converter for converting the string representation of the expression into the expression, wherein the converter is further configured to convert a string representation of a numerical value into a corresponding numerical value that can be processed by a computer system during runtime, and wherein the converter is part of the meta-object model; and
generating an executable runtime representation of the expression.

2. The method of claim 1, wherein the meta-object model is a meta-object facility (MOF) model.

3. The method of claim 1, wherein the application is a language specification.

4. The method of claim 1, wherein the converter includes an interpreter.

5. The method of claim 1, wherein the converter includes a compiler.

6. An apparatus for defining expressions comprising:
means for locating a generic string representation of an expression, the generic string representation including an identification of a programming language associated with the expression, the generic string to be converted into the expression prior to being processed by a computer system;
means for accessing a data type definition corresponding to the programming language associated with the expression, the data type definition including a converter for converting the string representation of the expression into the expression, wherein the converter is further configured to convert a string representation of a numerical value into a corresponding numerical value, wherein the data type definition and the converter are included in a meta object model of an application; and
means for generating an executable runtime representation of the expression based on the expression.

7. The apparatus of claim 6, wherein the meta-object model is a meta-object facility (MOF) model.

8. The apparatus of claim 6, wherein the application is a language specification.

9. The apparatus of claim 6, wherein the converter includes an interpreter.

10. The apparatus of claim 6, wherein the converter includes a compiler.

11. A computer program product for defining expressions in a meta-object model of an application, the computer program product comprising a computer readable medium having computer readable program code tangibly embedded therein, the computer readable program code comprising:
computer readable program code configured to locate a string representation of an expression including an identification of a programming language associated with the expression, the string representation of the expression being in a syntax different from a syntax associated with the programming language, and the string representation of the expression to be converted into the expression based on the programming language, wherein the string representation of the expression is defined in the meta-object model of the application;
computer readable program code configured to access a data type definition corresponding to the string representation of the expression, the data type definition including a converter for converting one or more of the string representation of the expression into the expression and a string representation of a data value into a data value instance, wherein the data type definition and the converter are part of the meta-object model; and
computer readable program code configured to generate an executable runtime representation of the expression based on the expression.

12. The computer program product of claim 11, wherein the meta-object model is a meta-object facility (MOF) model.

13. The computer program product of claim 11, wherein the application is a language specification.

14. The computer program product of claim 11, wherein the converter includes an interpreter.

15. The computer program product of claim 11, wherein the converter includes a compiler.

16. The method of claim 1, wherein the string representation is a string representation of a Java expression and the programming language associated with the expression is Java, and wherein the converter is to convert the string representation of the Java expression into the Java expression suitable for processing during runtime.

17. The apparatus of claim 6, wherein the converter is configured to use one of an expression interpreter or an expression compiler to parse the string representation of the expression based on the programming language.

18. The computer program product of claim 11, wherein the expression is a Java expression and the expression language is Java, and wherein the converter is to convert a string representation of the Java expression into the Java expression suitable for processing during runtime.

19. The computer program product of claim 11, wherein the string representation of the data value includes a string representation of a numerical value, and wherein the data instance includes a numerical value.

* * * * *